(12) United States Patent
Fontana et al.

(10) Patent No.: US 11,525,070 B2
(45) Date of Patent: Dec. 13, 2022

(54) (PER)FLUOROPOLYETHER POLYMERS AND USE THEREOF

(71) Applicant: SOLVAY SPECIALTY POLYMERS ITALY S.P.A., Bollate (IT)

(72) Inventors: Simonetta Antonella Fontana, Milan (IT); Antonio Puppo, Senago (IT); Pier Antonio Guarda, Arese (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 477 days.

(21) Appl. No.: 16/643,359

(22) PCT Filed: Jul. 30, 2018

(86) PCT No.: PCT/EP2018/070582
§ 371 (c)(1),
(2) Date: Feb. 28, 2020

(87) PCT Pub. No.: WO2019/042678
PCT Pub. Date: Mar. 7, 2019

(65) Prior Publication Data
US 2020/0190354 A1   Jun. 18, 2020

(30) Foreign Application Priority Data
Sep. 1, 2017  (EP) .................. 17188930

(51) Int. Cl.
| | | |
|---|---|---|
| *C09D 151/08* | (2006.01) | |
| *C08F 290/14* | (2006.01) | |
| *C08G 18/24* | (2006.01) | |
| *C08G 18/50* | (2006.01) | |
| *C08G 18/67* | (2006.01) | |
| *C08G 18/79* | (2006.01) | |
| *C08G 65/00* | (2006.01) | |

(52) U.S. Cl.
CPC ........ *C09D 151/08* (2013.01); *C08F 290/142* (2013.01); *C08G 18/246* (2013.01); *C08G 18/5015* (2013.01); *C08G 18/673* (2013.01); *C08G 18/792* (2013.01); *C08G 65/007* (2013.01); *C08G 2650/48* (2013.01)

(58) Field of Classification Search
None
See application file for complete search history.

(56) References Cited

U.S. PATENT DOCUMENTS

| | | | |
|---|---|---|---|
| 5,919,614 | A | 7/1999 | Livesey et al. |
| 8,552,083 | B1 | 10/2013 | Taranekar et al. |
| 2004/0181008 | A1* | 9/2004 | Hanazawa ............. C08G 18/67 524/589 |

FOREIGN PATENT DOCUMENTS

| | | |
|---|---|---|
| EP | 851246 A1 | 7/1998 |
| EP | 1411073 A1 | 4/2004 |
| EP | 1810987 A1 | 7/2007 |
| EP | 1995260 A1 | 11/2008 |
| WO | 98044015 A1 | 10/1998 |
| WO | 2009069974 A2 | 6/2009 |
| WO | 2017081126 A1 | 5/2017 |
| WO | 2017108901 A1 | 6/2017 |

* cited by examiner

*Primary Examiner* — Christopher M Rodd
(74) *Attorney, Agent, or Firm* — Osha Bergman Watanabe & Burton LLP

(57) ABSTRACT

The present invention relates to novel (per)fluoropolyether (PFPE) polymers, to a process for their manufacture and to their use as additives in coating compositions.

20 Claims, No Drawings

(PER)FLUOROPOLYETHER POLYMERS AND USE THEREOF

CROSS-REFERENCE TO RELATED PATENT APPLICATIONS

This application is a U.S. national stage entry under 35 U.S.C. § 371 of International Application No. PCT/EP2018/070582 filed Jul. 30, 2018, which claims priority to European patent application No. 17188930.6, filed on Sep. 1, 2017. The entire contents of these applications are explicitly incorporated herein by this reference.

TECHNICAL FIELD

The present invention relates to novel (per)fluoropolyether (PFPE) polymers, to a process for their manufacture and to their use as additives in coating compositions.

BACKGROUND ART

Flat-panel displays are electronic viewing technologies used to enable people to see content (still images, moving images, text, and visual material in general) in a range of entertainment, consumer electronics, personal computer, and mobile devices, and many types of medical, transportation and industrial equipment.

In the last years, some devices that use flat screens, such as tablet computers, smartphones and laptops, use touchscreens, which enable users to select on-screen icons or trigger actions (e.g., playing a digital video) by touching the screen.

Touchscreens are input and output devices normally layered on the top of an electronic visual display of an information processing system, which enables the user to interact directly with what is displayed. Touchscreens are common in devices such as game consoles, personal computers, tablet computers, electronic voting machines, point of sale systems, and smartphones. They can also be attached to computers or, as terminals, to networks. They also play a prominent role in the design of digital appliances such as personal digital assistants (PDAs) and e-readers. Using the touchscreens, a user can give input or control the information processing system by touching the screen with a special stylus (resistive touchscreens) and/or one or more fingers (capacitive touchscreens).

With the aim of protecting the external layer of these displays, an external cover is generally used as a protection against impacts. Polycarbonate was at first the material of choice because of its low cost and ease of manufacturing. However, a chemically strengthened thin display cover glass was found to provide improved rigidity while reducing the overall thickness requirement.

More recently, as mobile devices are becoming thinner, plastic covers have been proposed on the market. Similarly to the glass covers, the newly proposed plastic covers should be highly durable to protect the device from every day wear and tear while being thinner, lighter, and aesthetically pleasing. Also, with the aim of improving their resistance to scratches and abrasion, a transparent coating layer is provided onto said plastic cover.

Polymer compounds and compositions able of providing a transparent film onto said substrate surface have been disclosed in the art.

Among the others, EP 1411073 (Daikin Industries, Ltd.) discloses a perfluoropolyether-containing surface modification agent, which is said to form a homogeneous film, particularly a transparent film on a substrate surface. The PFPE-containing compound has a carbon-carbon double bond and is obtainable by reacting (A) a triisocyanate prepared by trimerizing a diisocyanate and (B) active hydrogen-containing compounds representing a combination of at least two such compounds and comprising (B-1) a perfluoropolyether having one active hydrogen and (B-2) a monomer having active hydrogen and a carbon-carbon double bond. More in particular, the component (B) comprises:

(B-1) a perfluoropolyether having one active hydrogen, i.e., a mono-functional perfluoropolyether represented by the following formula:

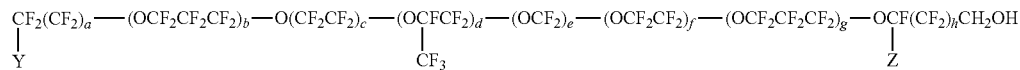

wherein Y and Z are a fluorine atom or trifluoromethyl group;
(B-2) a monomer having an active hydrogen and a carbon-carbon double bond, and
(B-3) optionally present, a compound having an active hydrogen atom, for example an active hydroxyl group.
This patent document discloses that a mixture of the perfluoropolyether-containing compounds can contain:
a perfluoropolyether-containing compound molecule which does not bond to the component (B-1),
a perfluoropolyether-containing compound molecule which bonds to one molecule of the component (B-1), and/or
a perfluoropolyether-containing compound molecule which bonds to two molecules of the component (B-1).

EP 1995260 (Daikin Industries, Ltd.) discloses a high energy ray-curable composition containing the following components:
(A) 100 parts by weight of a polyfunctional acrylate;
(B) 1-30 parts by weight of an organosiloxane having an aliphatic unsaturated bond;
(C) 1-100 parts by weight of colloidal silica;
(D) 0.2-20 parts by weight of a fluorine compound having an aliphatic unsaturated bond.

WO 2009/069974 (LG CHEM., Ltd.) discloses a coating composition comprising a binder containing a UV-curable functional group, a compound containing a fluorine UV-curable functional group, a photoinitiator, and nano-sized particles.

WO 2017/108901 (Solvay Specialty Polymers Italy S.p.A.) discloses a method for providing a transparent coating onto at least one surface of a substrate selected from plastic, metal or glass; said method comprising a step of contacting at least one surface of a substrate with a composition comprising at least one (per)fluoropolyether polymer comprising at least one (per)fluoropolyoxyalkylene chain having two chain ends, wherein at least one chain end comprises at least one unsaturated moiety and at least one UV-curable component; and a step of curing said composition.

However, none of the above mentioned patent applications provides any hint or suggestion to further modify the chemical structure of the PFPE-comprising polymers, with the expectation to improve their solubility in specific solvents such as acetone, ethyl acetate and methylethylketone.

SUMMARY OF INVENTION

Although the polymers described in EP 1411073 cited above are said to be soluble in several organic solvents, their poor solubility or insolubility in solvents like acetone, ethyl acetate and methylethylketone, still limit their use as additives in compositions for providing transparent coatings onto plastic substrates.

Also, the need still exists of providing soluble (per)fluoropolyether polymers comprising a long (per)fluorinated chain and having high molecular weight.

The Applicant faced the problem of providing novel (per)fluoropolyether polymers, which are soluble in the solvents typically used for preparing composition for transparent coatings, notably acetone, ethyl acetate and methylethylketone, and which do not affect the transparent properties of the final coating.

Thus, in a first aspect the present invention relates to a (per)fluoropolyether polymer [polymer (P)] comprising at least one (per)fluoropolyoxyalkylene chain [chain $(R_{pf})$] having two chain ends, wherein at least one of said chain ends bears at least one group of formula -B-(E)$_t$, wherein:
t is an integer equal to or higher than 2, more preferably from 2 to 5, even more preferably from 2 to 3;
B is a group complying with the following formula (B-I):

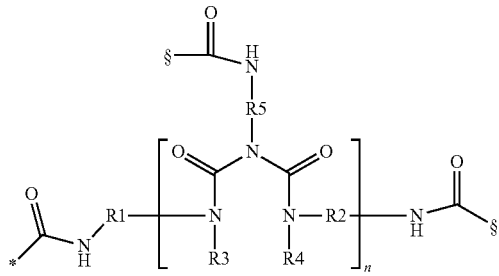

(B-I)

wherein
R1, R2 and R5, identical or different each other, are a linear or cyclic aliphatic group comprising 6 carbon atoms, optionally substituted with one or more linear or branched alkyl group having from 1 to 3 carbon atoms, or a 6-membered aromatic group, optionally substituted with one or more linear or branched alkyl group having from 1 to 3 carbon atoms,
R3 and R4 are each hydrogen atom or together they form a group of formula —C(=O)—,
n is an integer from 1 to 4, preferably from 1 to 2,
symbol (*) indicates the bond to said chain $(R_{pf})$, and
each symbol (§) indicates the bond to said moiety E; and
E is a moiety of formula (E-I):

—[OCH(CH$_3$)CH$_2$]$_z$—R$_U$    (E-I)

wherein
z is in an integer from 1 to 15,
$(R_U)$ is an unsaturated moiety.

In a second aspect, the present invention relates to a process for the synthesis of polymer (P) as defined above, said process comprising the following steps:
(I) contacting at least one poli-isocyanate compound [compound (NCO)] with at least one compound [compound (U)] of formula H—[OCH(CH$_3$)CH$_2$]$_z$—R$_U$ wherein R$_U$ is an unsaturated moiety and z is an integer from 1 to 15,
wherein the ratio between the equivalents of said compound (NCO) and of said compound (U) is higher than 1;
(II) contacting the compound obtained in step (I) with at least one (per)fluoropolyether polymer [polymer (PFPE-OH)] comprising a (per)fluoropolyoxyalkylene chain having two chain ends, wherein at least one of said chain ends comprises a hydroxy group,
thus obtaining polymer (P) as defined above.

In a third aspect, the present invention relates to a composition [composition (C)] comprising at least one polymer (P) as defined above.

In a fourth aspect, the present invention relates to a method for providing a transparent coating onto at least one surface of a plastic substrate, said method comprising:
(i) providing at least one plastic substrate having at least one surface;
(ii) contacting said at least one surface with polymer (P) or with composition (C) as defined above; and
(iii) curing said polymer (P) or said composition (C) onto said at least one surface.

In a fifth aspect, the present invention relates to the use of said composition (C) or of said polymer (P) as defined above, for providing a transparent coating onto at least one surface of said plastic substrate.

Advantageously, the coating obtained with said composition (C) or said polymer (P) according to the present invention further provides outstanding water- and oil-repellency, easy to clean and stain removal properties, as well as anti-fingerprint performances to the plastic substrate onto which it is applied.

All this properties are of particular importance when the plastic substrate is notably used as protective layer for touchscreens of portable electronic devices.

DESCRIPTION OF EMBODIMENTS

For the purpose of the present description and of the following claims:
the use of parentheses around symbols or numbers identifying the formulae, for example in expressions like "polymer (P)", etc., has the mere purpose of better distinguishing the symbol or number from the rest of the text and, hence, said parenthesis can also be omitted;
the acronym "PFPE" stands for "(per)fluoropolyether" and, when used as substantive, is intended to mean either the singular or the plural from, depending on the context;
the term "(per)fluoropolyether" is intended to indicate fully or partially fluorinated polyether;
the terms "clear" and "transparent" are used as synonyms.
Preferably, said chain $(R_{pf})$ is a chain of formula —(CFX)$_{z1}$O(R$_f$)(CFX')$_{z2}$-D-O— wherein $z1$ and $z2$, equal or different from each other, are equal to or higher than 1, preferably from 1 to 10, more preferably from 1 to 3;

X and X', equal or different from each other, are —F or —$CF_3$, provided that when a and/or b are higher than 1, X and X' are —F;

D is a hydrogenated alkylene chain comprising from 1 to 6 and even more preferably from 1 to 3 carbon atoms, said alkyl chain being optionally substituted with at least one perfluoroalkyl group comprising from 1 to 3 carbon atoms;

($R_f$) comprises, preferably consists of, repeating units $R°$, said repeating units being independently selected from the group consisting of:

(i) —CFXO—, wherein X is F or $CF_3$;
(ii) —CFXCFXO—, wherein X, equal or different at each occurrence, is F or $CF_3$, with the proviso that at least one of X is —F;
(iii) —$CF_2CF_2CW_2O$—, wherein each of W, equal or different from each other, are F, Cl, H;
(iv) —$CF_2CF_2CF_2CF_2O$—;
(v) —$(CF_2)_j$—CFZ—O— wherein j is an integer from 0 to 3 and Z is a group of general formula —O—$R_{(f-a)}$-T, wherein $R_{(f-a)}$ is a fluoropolyoxyalkene chain comprising a number of repeating units from 0 to 10, said recurring units being chosen among the following: —CFXO—, —$CF_2CFXO$—, —$CF_2CF_2CF_2O$—, —$CF_2CF_2CF_2CF_2O$—, with each of each of X being independently F or $CF_3$ and T being a $C_1$-$C_3$ perfluoroalkyl group.

More preferably, D is —$CH_2$—.

Preferably, said chain ($R_f$) complies with the following formula:

$$—[(CFX^1O)_{g1}(CFX^2CFX^3O)_{g2}(CF_2CF_2CF_2O)_{g3}(CF_2CF_2CF_2CF_2O)_{g4}]— \quad (R_f\text{-I})$$

wherein
$X^1$ is independently selected from —F and —$CF_3$,
$X^2$, $X^3$, equal or different from each other and at each occurrence, are independently —F, —$CF_3$, with the proviso that at least one of X is —F;
$g1$, $g2$, $g3$, and $g4$, equal or different from each other, are independently integers $\geq 0$, such that $g1+g2+g3+g4$ is in the range from 2 to 300, preferably from 2 to 100; should at least two of $g1$, $g2$, $g3$ and $g4$ be different from zero, the different recurring units are generally statistically distributed along the chain.

More preferably, said chain ($R_f$) is selected from chains of formula:

$$—[(CF_2CF_2O)_{a1}(CF_2O)_{a2}]— \quad (R_f\text{-IIA})$$

wherein:
$a1$ and $a2$ are independently integers $\geq 0$ such that the number average molecular weight is between 400 and 10,000, preferably between 400 and 5,000; both $a1$ and $a2$ are preferably different from zero, with the ratio $a1/a2$ being preferably comprised between 0.1 and 10;

$$—[(CF_2CF_2O)_{b1}(CF_2O)_{b2}(CF(CF_3)O)_{b3}(CF_2CF(CF_3)O)_{b4}]— \quad (R_f\text{-IIB})$$

wherein:
$b1$, $b2$, $b3$, $b4$, are independently integers $\geq 0$ such that the number average molecular weight is between 400 and 10,000, preferably between 400 and 5,000; preferably $b1$ is 0, $b2$, $b3$, $b4$ are >0, with the ratio $b4/(b2+b3)$ being $\geq 1$;

$$—[(CF_2CF_2O)_{c1}(CF_2O)_{c2}(CF_2(CF_2)_{cw}CF_2O)_{c3}]— \quad (R_f\text{-IIC})$$

wherein:
$cw=1$ or 2;
$c1$, $c2$, and $c3$ are independently integers $\geq 0$ chosen so that the number average molecular weight is between 400 and 10,000, preferably between 400 and 5,000; preferably $c1$, $c2$ and $c3$ are all >0, with the ratio $c3/(c1+c2)$ being generally lower than 0.2;

$$—[(CF_2CF(CF_3)O)_d]— \quad (R_f\text{-IID})$$

wherein:
d is an integer >0 such that the number average molecular weight is between 400 and 10,000, preferably between 400 and 5,000;

$$—[(CF_2CF_2C(Hal^*)_2O)_{e1}—(CF_2CF_2CH_2O)_{e2}—(CF_2CF_2CH(Hal^*)O)_{e3}]— \quad (R_f\text{-IIE})$$

wherein:
Hal*, equal or different at each occurrence, is a halogen selected from fluorine and chlorine atoms, preferably a fluorine atom;
$e1$, $e2$, and $e3$, equal to or different from each other, are independently integers $\geq 0$ such that the ($e1+e2+e3$) sum is comprised between 2 and 300.

Still more preferably, said chain ($R_f$) complies with formula ($R_f$-III) here below:

$$—[(CF_2CF_2O)_{a1}(CF_2O)_{a2}]— \quad (R_f\text{-III})$$

wherein:
$a1$, and $a2$ are integers >0 such that the number average molecular weight is between 400 and 10,000, preferably between 400 and 5,000, with the ratio $a1/a2$ being generally comprised between 0.1 and 10, more preferably between 0.2 and 5.

Preferably, said moiety ($R_U$) is selected in the group consisting of:

$$—O—C(=O)—CR_H=CH_2 \quad (R_U\text{-I})$$

$$—O—C(=O)—NH—CO—CR_H=CH_2 \quad (R_U\text{-II})$$

wherein
$R_H$ is H or a linear or branched $C_1$-$C_6$ alkyl group; more preferably H or a linear or branched $C_1$-$C_3$ alkyl group.

Advantageously, when in formula (B-I) above n is equal to 1, said group (B) is a trivalent group, i.e., it is capable of forming at least three chemical bonds, preferably one with said chain ($R_{pf}$) and two with one said groups of formula (E-I). However, when in formula (B-I) above n is an integer higher than 1, such as from 2 to 4, said group (B) has four or more valences, i.e., it is capable of forming four or more chemical bonds, preferably one with said chain ($R_{pf}$) and three or more with one said groups of formula (E-I).

Preferably, R1, R2 and R5 are identical to each other.

According to a preferred embodiment, said group (B) complies with the following formulae (B-I-i) to (B-I-v):

(B-I-i)

-continued

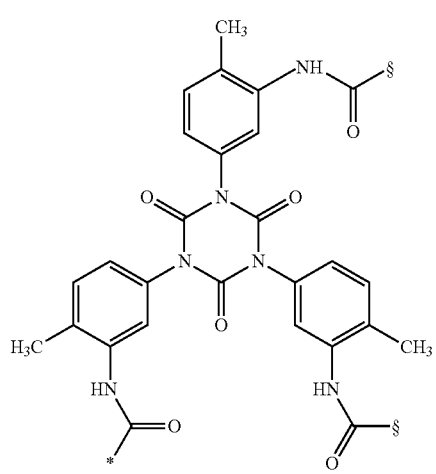
(B-I-ii)

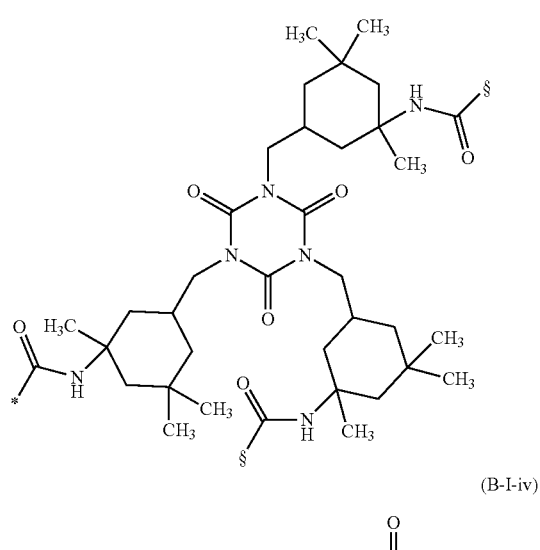
(B-I-iii)

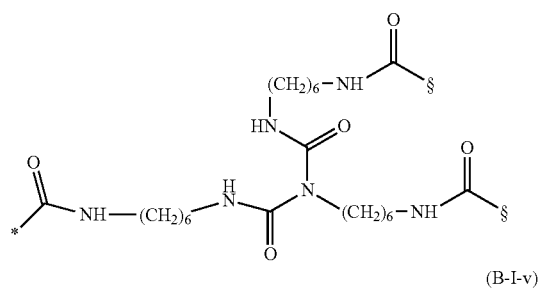
(B-I-iv)

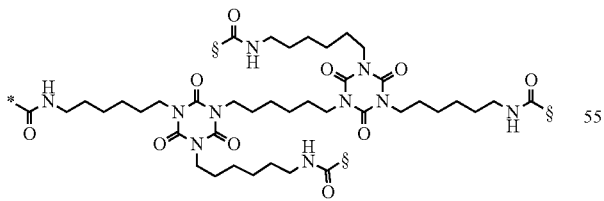
(B-I-v)

wherein
symbol (*) indicates the bond to said chain ($R_{pf}$) and
each of symbols (§) indicates the bond to a group of formula (E-I).

Thus, according to a preferred embodiment, said polymer (P) complies with the following formula (P-I):

T-($R_{pf}$)-B-[(E-I)]$_t$  (P-I)

wherein
($R_{pf}$), (B), (E-I) and t are as defined above and
T is a neutral group selected from: —H, —F, —Cl and linear or branched perfluoroalkyl group comprising from 1 to 3 carbon atoms; or a group of formula (T-I):

-D*-O-(B)-[(E-I)]$_{t^*}$  (T-I)

wherein
B and (E-I) have the same meanings defined above,
D* has the same meanings defined above for D, and
t* has the same meanings defined above for t.

As will be apparent to those skilled in the art, said compound (NCO) is obtained from the trimerization of a diisocyanate compound. As used in the present description and in the following claims, the expression "a group obtained trimerization of a diisocyanate compound" is intended to indicate a group obtained from the reaction of three molecules of the same diisocyanate compound, to form a linear or cyclic molecule comprising at least three isocyanate groups.

Preferably, said compound (NCO) comprises at least three isocyanate groups, more preferably from 3 to 5 isocyanate groups.

The person skilled in the art will understand that, when the diisocyanate compounds are reacted together to form said compound (NCO), the reaction can provide mixtures of molecules comprising three, four or even more isocyanate groups.

Preferably, said diisocyanate compound is selected in the group comprising, more preferably consisting of: hexamethylene diisocyanate (HDI); isophorone diisocyanate (IPDI); xylylene diisocyanate; hydrogenated xylylene diisocyanate; isomers of methylene-bis(cyclohexyl isocyanate) [also referred to as hydrogenated MDI] and mixtures thereof; isomers of toluene diisocyanate (TDI), such as 2,4-TDI and 2,6-TDI, and mixtures thereof; isomers of methylene diphenyl diisocyanate (MDI) such as 2,2'-MDI, 2,4'-MDI and 4,4'-MDI and mixtures thereof; toluidine diisocyanate; and naphthalene diisocyanate.

Suitable examples of said compound (NCO) comprising at least three isocyanate groups are represented by the following formulae (I) to (IV):

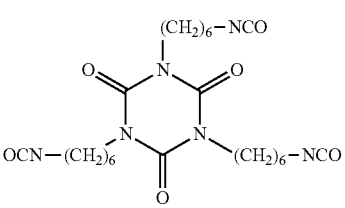
(I)

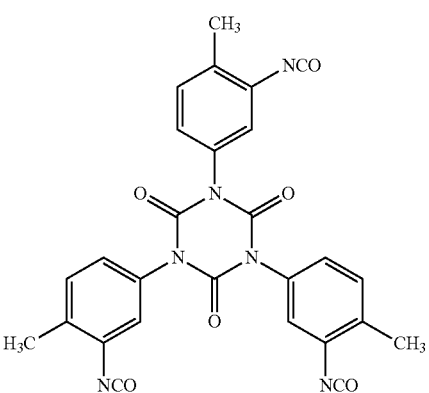
(II)

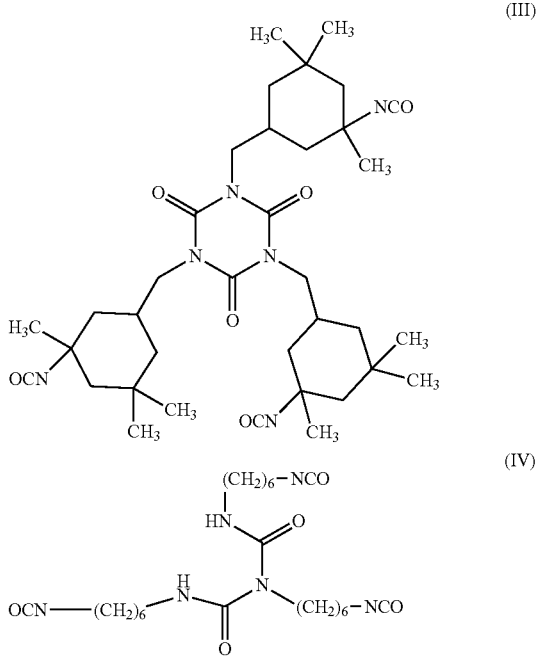

(III)

(IV)

Suitable examples of said compound (NCO) comprising at least four isocyanate groups are represented by the following formula (V):

above wherein T is a neutral group and polymer (P-I**) complying with formula (P-I) above wherein T is a group of formula (T-I).

Good results have been obtained within the present invention starting from (per)fluoropolyether polymers commercially available from Solvay Specialty Polymers Italy S.p.A. under the tradename Fomblin® PFPE.

Preferably, said step (II) is performed in the presence of a fluorinated solvent. Said fluorinated solvent is preferably selected from the group comprising: fluorinated hydrocarbons, hexafluoroxylene, chlorotrifluoro-toluene, trifluoro-toluene, hexafluorobenzene and mixtures thereof.

Polymer (P) can be used as such, however a composition [composition ($C_i$)] comprising at least one polymer (P) and at least one solvent is preferably provided.

Preferably, said composition ($C_i$) is in the form of a solution.

Said at least one solvent is preferably selected in the group comprising:

ketones for instance methylethylketone (MEK), methyl-isobutylketone (MIBK); esters for instance ethyl acetate, butyl acetate, isobutyl acetate; organic solvents containing in the molecule an ester-ether group such as polyoxyethylene monoethyl-ether acetate, polyoxyethylene monobutylether acetate, polyoxy butylene mono-ethyl-ether acetate, polyoxy-butylene monobutylether acetate, polyoxyethylene diacetate, polyoxybutylene-diacetate, 2-ethoxy ethylacetate, ethyleneglycol diacetate, butyleneglycol diacetate; and mixtures thereof.

Good results have been obtained by using ethyl acetate, methyl-ethyl-ketone and acetone.

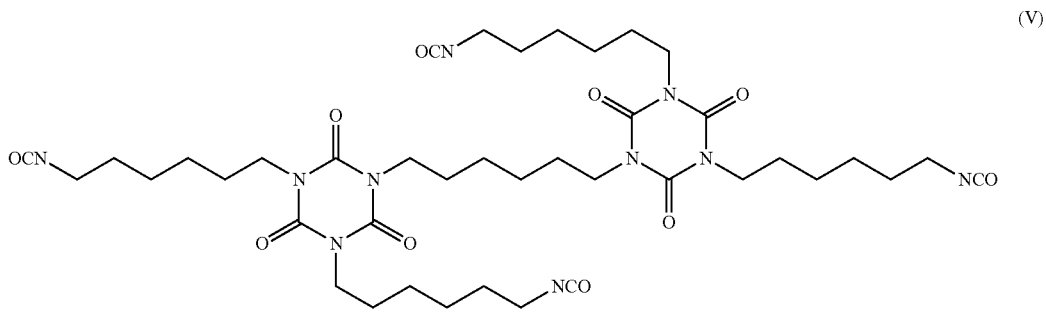

(V)

The person skilled in the art will also understand that suitable compound (NCO) can be prepared in situ before starting the polymerization reaction or commercially available products can be used. Among the latter, the following are advantageously used: Vestanat® commercially available from Evonik, Desmodur® from Covestro, and the like.

Preferably, the equivalent ratio between said compound (NCO) and said compound (U) is from 1.1 to 2, more preferably from 1.2 to 1.8.

Preferably, said step (I) is performed under heating, more preferably from about 35° C. to about 70° C.

Preferably, said polymer (PFPE-OH) comprises one chain ($R_{pf}$) as defined above, having two chain ends, wherein at least one chain end bears one hydroxy group.

Preferably, the functionality of said polymer (PFPE-OH) is of at least 1.0 and up to 2.0. The functionality (F) can be calculated for example as disclosed in EP 1810987 A (SOLVAY SOLEXIS S.P.A.). The person skilled in the art will understand that when a mixture of mono-functional and bi-functional polymer (PFPE-OH) is used, a is obtained comprising polymer (P-I*) complying with formula (P-I)

Preferably, said composition ($C_i$) contains polymer (P) in an amount of from 10 to 90 wt. %, more preferably from 15 to 50 wt. %, based on the total weight of said composition ($C_i$).

Preferably, said composition ($C_i$) contains at least one solvent in an amount of from 10 to 90 wt. %, more preferably from 50 to 85 wt. %, based on the total weight of said composition ($C_i$).

Said composition ($C_i$) is advantageously added to a composition comprising at least one UV-curable component [composition (C*)], to provide a composition [composition ($C_F$)] comprising at least one polymer (P), at least one solvent as defined above and at least one UV-curable component, such that the amount of said polymer (P) in said composition ($C_F$) is from 0.01 to 8 wt. %, more preferably from 0.5 to 5 wt. %, based on the total weight of said composition ($C_F$).

Composition ($C_F$) according to the present invention can be advantageously prepared by contacting composition ($C_i$) as defined above with said composition (C*) as defined above and optionally mixing.

Said composition (C*) can contain further ingredients, such as cross-linkers, transparent fillers, photo-initiators, volatile or non-volatile additives, for example selected from binders, catalysts, leveling agents, wetting agents, anticratering agents, dyes, rheology control agents, antioxidants and/or light stabilizers.

Depending on its final use, at least one of the further ingredients listed herein above can be added to said composition ($C_F$) if necessary.

Suitable cross-linker agents include for example trans-esterification cross-linking agents, amino resin cross-linking agents, such as melamine-formaldehyde resins; trisalkoxycarbonylaminotriazine cross-linking agents, and the like.

Suitable transparent fillers include for example silica, more preferably nano-silica.

Each of said additional ingredient and additive is preferably used in conventional amounts, such as for example in an amount up to 8 wt. %, more preferably from 0.01 to 5 wt. % based on the total weight of composition (C).

As used within the present description and the following claims, the expression "composition (C)" is intended to comprise both said "composition ($C_i$)" and said "composition ($C_F$)", unless otherwise specified.

Said step (i) of contacting can be performed for example at room temperature. More elaborate contacting or mixing methods can be employed, which require for example the use of a mechanical shaker or heating.

Preferably, step (i) is performed by a suitable method, including for example spray coating, dip coating, roll-to-roll, spin-coating, casting and others.

Composition ($C_i$) or said composition ($C_F$) can be applied to the surface of a suitable substrate to form a clear (i.e. transparent) coating layer.

Suitable plastic substrate are preferably selected from the group comprising, preferably consisting of: polyethylene terephthalate (PET), polycarbonate (PC), polyvinyl chloride (PVC), thermoplastic olefin (TPO), thermoplastic polyurethane (TPU), polypropylene (PP), acrylonitrile butadiene styrene (ABS) and polyamides (PA).

Preferably, the film obtained after the spray step has a thickness of from 5 to 500 μm, more preferably from 10 to 250 μm, and even more preferably from 25 to 175 μm.

Preferably, step (ii) is performed by UV-curing composition (C) onto said at least one surface.

The curing conditions depend on the ingredients of said composition (C) and from the circumstances under which the coating and curing process is carried out.

Any source of radiation can be used. The radiation does can be adjusted by the skilled persons as a function of the composition (C) that is used. Good results have been obtained by applying a radiation of from 200 to 750 W. Preferably, when said step of curing is performed using UV, the curing time is from 1 to 50 seconds, more preferably from 5 to 30 seconds.

Should the disclosure of any patents, patent applications, and publications which are incorporated herein by reference conflict with the description of the present application to the extent that it may render a term unclear, the present description shall take precedence The invention will be herein after illustrated in greater detail by means of the Examples contained in the following Experimental Section; the Examples are merely illustrative and are by no means to be interpreted as limiting the scope of the invention.

EXPERIMENTAL SECTION

Material

VESTANAT® HT 2500/100 (aliphatic polyisocyanate based on hexamethylene diisocyanate, NCO content 23%) and VESTANAT® T 1890/100 (cyclo-aliphatic polyisocyanate based on isophorone diisocyanate, NCO content 17.3%) were obtained from Evonik;

Fluorolink® AD1700 PFPE polymer was manufactured by Solvay Specialty Polymers Italy S.p.A.;

dibutyl-tin-dilaurate, methylethylketone, ethylacetate, acetone, propylene glycol monomethyl ether, Darocure® 1173 (2-Hydroxy-2-methylpropiophenone), 2,6-di-ter-butyl-4-methylphenol, poly(propyleneglycol) acrylate and 2-hydroxyethylacrylate were purchased from Sigma Aldrich;

hexafluoroxylene was obtained from Miteni S.P.A.;

CN132 low viscosity aliphatic diacrylate oligomer and SR339C (2-phenoxy-ethyl acrylate) reactive diluent were obtained from Arkema.

PET in sheets "DuPont Teijin Films™" grade Melinex® ST504 (thickness 175 μm) were used as plastic substrate for film deposition.

Methods

Determination of the Average Functionality

The average functionality (F) of the PFPE-alcohol used as starting material, defined by the following equation:

$$\text{average functionality} = 2 \cdot E_f / (E_f + E_n)$$

wherein
$E_f$ is the number of functional end groups and
$E_n$ is the number of non-functional end groups
was determined by means of $^1$H-NMR and $^{19}$F-NMR according to known methods, for example as disclosed in U.S. Pat. No. 5,919,614 with suitable modifications.

Film Application Technique

Film of the UV-curable PFPE containing formulations were prepared using wet film wire wound applicator rods.

Film Curing

Ventilated electric oven (Tmax=300° C.) was used for the thermal treatment of thin film.

UV chamber "Helios Ital-Quartz" with high pressure mercury lamp 800 watt with complete spectrum from 180 nm to visible light, including UVC, UVB and UVA was used for UV-crosslinking of the film.

Film Testing

Static contact angles were measured using Drop Shape Analyzer "Krüss DSA10" from Krüss GmbH, Germany, by depositing at least five drops of liquid on the sample, in order to have average value and standard deviation.

Surface free energy was calculated in accordance with method FAWKES.

Synthesis 1—Preparation of Polymer P1

A 250-ml round bottom flask equipped with a mechanical stirrer, a dropping funnel and a refrigeration column was charged under inert atmosphere with 40.0 g of methylethylketone (MEK), 6.0 g of Vestanat® HT2500/LV; 0.10 g of a 20% solution of dibutyl tin dilaurate (DBTDL) in ethylacetate; 3,6*10$^{-3}$ g of 2,6-di-ter-butyl-4-methylphenol (BHT) and the temperature was raised up to 55° C.

Then, 10.4 g of poly(propylene glycol)acrylate (MW=475) were dropped into the flask and the reaction mixture was stirred for two hours.

40.0 g of hexafluoroxylene (HFX) and 20.0 g of the perfluoropolyether-alcohol complying with formula:

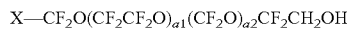

X—CF$_2$O(CF$_2$CF$_2$O)$_{a1}$(CF$_2$O)$_{a2}$CF$_2$CH$_2$OH (average MW=2358; a1/a2=1.14; X=—F or —CH$_2$OH in such a ratio that F=1.29) were then added into the reactor and the mixture was stirred for about 6 hours. The conversion grade was monitored both by FTIR analysis, by monitoring the disappearance of the 2250 cm$^{-1}$ isocyanate absorption band, and by $^{19}$FNMR analysis observing the shifting of the pre-terminal —CF$_2$— from -81.3 and -83.3 ppm (when linked to the —CH$_2$OH group) to -77.5 and -79.5 ppm when linked to moiety —CH$_2$OC(O)NH—.

The solvents were then distilled under vacuum (at 10$^{-1}$ mbar and 60° C.) and 34.2 g of Polymer P1 were isolated (the yield of the reaction was 94%).

Synthesis 2—Preparation of Polymer P2

A 250-ml round bottom flask equipped with a mechanical stirrer, a dropping funnel and a refrigeration column was charged under inert atmosphere with 45.0 g of methylethylketone (MEK), 8.4 g of Vestanat® T 1890/100; 0.11 g of a 20% solution dibutyl tin dilaurate (DBTDL) in ethylacetate, 4*10$^{-3}$ g of 2,6-di-ter-butyl-4-methylphenol (BHT) and the temperature was raised up to 55° C.

Then, 11.0 g of poly(propylene glycol)acrylate (MW=475) were dropped into the flask and the reaction mixture was stirred for 3 hours.

45.0 g of hexafluoroxylene (HFX) and 20 g of the perfluoropolyether-alcohol complying with formula:

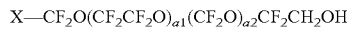

X—CF$_2$O(CF$_2$CF$_2$O)$_{a1}$(CF$_2$O)$_{a2}$CF$_2$CH$_2$OH (average MW=2155; a1/a2=1.25; X=—F or —CH$_2$OH in such a ratio that F=1.25) were then added into the reactor and the mixture was stirred for about 8 hours. The conversion grade was monitored both by FTIR analysis, by monitoring the disappearance of the 2250 cm$^{-1}$ isocyanate absorption band, and by $^{19}$FNMR analysis observing the shifting of the pre-terminal —CF$_2$— from -81.3 and -83.3 ppm (when linked to the —CH$_2$OH group) to -77.5 and -79.5 ppm when linked to moiety —CH$_2$OC(O)NH—.

The solvents were then distilled under vacuum (at 10$^{-1}$ mbar and 60° C.) and 38.3 g of Polymer P2 were isolated (the yield of the reaction was 97%).

Synthesis 3—Preparation of Polymer P3

A 250-ml round bottom flask equipped with a mechanical stirrer, a dropping funnel and a refrigeration column was charged under inert atmosphere with 40.0 g of methylethylketone (MEK), 5.0 g of Vestanat® HT2500/LV; 0.086 g of a 20% solution of dibutyl tin dilaurate (DBTDL) in ethylacetate; 3.3*10$^{-3}$ g of 2,6-di-ter-butyl-4-methylphenol (BHT) and the temperature was raised up to 55° C.

Then, 8.6 g of poly(propylene glycol)acrylate (MW=475) were dropped into the flask and the reaction mixture was stirred for two hours.

40.0 g of hexafluoroxylene (HFX) and 20.0 g of the perfluoropolyether-alcohol of formula:

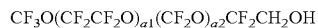

CF$_3$O(CF$_2$CF$_2$O)$_{a1}$(CF$_2$O)$_{a2}$CF$_2$CH$_2$OH (average MW=2206; a1/a2=1.2) were then added into the reactor and the mixture was stirred for about 6 hours. The conversion grade was monitored both by FTIR analysis, by monitoring the disappearance of the 2250 cm$^{-1}$ isocyanate absorption band, and by $^{19}$FNMR analysis observing the shifting of the pre-terminal —CF$_2$— from -81.3 and -83.3 ppm (when linked to the —CH$_2$OH group) to -77.5 and -79.5 ppm when linked to moiety —CH$_2$OC(O)NH—.

The solvents were then distilled under vacuum (10$^{-1}$ mbar, 60° C.) and 32.4 g of Polymer P3 were isolated (the yield of the reaction was 96%).

Comparative Synthesis 4: Preparation of Polymer C-P1

A 250-ml round bottom flask equipped with a mechanical stirrer, a dropping funnel and a refrigeration column was charged under inert atmosphere with 35.0 g of methylethylketone (MEK), 6.0 g of Vestanat® HT2500/LV; 0.10 g of a 20% solution of dibutyl tin dilaurate (DBTDL) in ethylacetate; 3*10$^{-3}$ g of 2,6-di-ter-butyl-4-methylphenol (BHT) and the temperature was raised up to 55° C.

Then, 2.5 g of 2-hydroxyethylacrylate (MW=116) were dropped into the flask and the reaction mixture was stirred for two hours.

30.0 g of hexafluoroxylene (HFX) and 20.0 g of the perfluoropolyether-alcohol complying with formula:

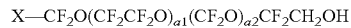

X—CF$_2$O(CF$_2$CF$_2$O)$_{a1}$(CF$_2$O)$_{a2}$CF$_2$CH$_2$OH (average MW=2358; a1/a2=1.14; X=—F or —CH$_2$OH in such a ratio that F=1.29) were then added into the reactor and the mixture was stirred for about 6 hours. The conversion grade was monitored both by FTIR analysis, by monitoring the disappearance of the 2250 cm$^{-1}$ isocyanate absorption band, and by $^{19}$FNMR analysis observing the shifting of the preterminal —CF$_2$— from -81.3 and -83.3 ppm (when linked to the —CH$_2$OH group), to -77.5 and -79.5 ppm when linked to moiety —CH$_2$OC(O)NH—.

The solvents were then distilled under vacuum (10$^{-1}$ mbar, 70° C.) and 26.1 g of Polymer C-P1 were isolated, which is considered representative of the teaching of EP 1411073 cited in the background section.

Example 1—Solubility Test

Each of Polymers P1, P2, P3 prepared following the description in Synthesis 1 to 3 and polymer C-P1(*) prepared following the description in Comparative Synthesis 4 above, were added to hydrogenated solvents, so that the final polymer content was equal to 20% (w/w). The obtained mixtures were dispersed by magnetic stirring. Each mixture was then visually inspected after stirring and after 4 weeks of standing at room temperature.

The results are reported in the following Table 1.

The evaluation of the solubility was as follows:

LS=Limpid Solution
SO=Slightly Opalescent
NS=Not Soluble, the mixture separates in two phases.

TABLE 1

|  | P1 | | P2 | | C-P1(*) | |
| --- | --- | --- | --- | --- | --- | --- |
|  | After stirring | After 4 weeks | After stirring | After 4 weeks | After stirring | After 4 weeks |
| Acetone | LS | LS | LS | LS | NS | NS |
| MEK | LS | LS | LS | LS | NS | NS |
| Ethylacetate | LS | LS | LS | LS | NS | NS |

(*)comparative
MEK = methyl ethyl ketone

Preparation of the Formulations

Step (A)

A 25-ml dark glass flask equipped with mechanical stirrer was charged with 9 g of low viscosity aliphatic diacrylate oligomer (CN132), 3 g of 2-phenoxyethyl acrylate and 1.2 g of propylene glycol monomethyl ether. Then, 0.2 g of 2-hydroxy-2-methylpropiophenone were added under stirring for 30 minutes, thus obtaining a blanc [formulation B(*)], which did not contain fluorinated component.

Step (B)

Each of Polymers P1, P2, P3 and commercially available Fluorolink® AD1700 were dissolved in organic solvents, obtaining corresponding solutions S1, S2, S3 and SF(*) with dry content equal to 20% w/w.

For the preparation of solutions S1, S2 and SF(*) methyl ethyl ketone was used, while acetone was used for solution S3.

Step (C)

A 25-ml dark glass flask equipped with mechanical stirrer was charged with 9 g of low viscosity aliphatic diacrylate oligomer (CN132), 3 g of 2-phenoxyethyl acrylate and 1.2 g of propylene glycol monomethyl ether. Then 1.2 g of each polymer solution S1, S2, S3 and SF(*) prepared as disclosed in Method (B) above were added under the stirring, and 0.2 g of 2-hydroxy-2-methylpropiophenone were added under stirring for 30 minutes.

Four formulations F1, F2, F3 and FF(*) were obtained from each corresponding polymer solution S1, S2, S3 and SF(*).

Preparation of the Films

Each Formulation B(*), F1, F2, F3 and FF(*) was casted on PET substrate.

Freshly prepared films were placed in an oven for 3 minutes at 90° C. in order to evaporate the solvent. Then, the films were placed in stainless steel container with top made in quartz and connected to the nitrogen gas line. After 30 seconds of nitrogen purging, curing of the samples was carried out for 7 seconds under UV-exposure, maintaining nitrogen flux in the container.

Five films named BLANC(*), FILM1, FILM2, FILM3 and FILMF(*) were obtained from corresponding formulations.

FILMF(*) was non transparent and not homogeneous, hence not suitable for the preparation of the film according to the present invention. Therefore no further measurement of its properties was performed.

Example 2 Measurement of the Surface Properties

Measurement of the surface contact angles versus water and n-hexadecane was carried out on each film BLANC(*), FILM1, FILM2 and FILM3, by depositing at least five drops of liquid on the sample.

The average results are reported in the following Table 2:

TABLE 2

| Film | SCA vs water (°) | SCA vs n-hexadecane (°) | Surface Free Energy (SFE) at 20° C. (mN/m) | Dispersive contribution of SFE (mN/m) | Polar contribution of SFE (mN/m) |
|---|---|---|---|---|---|
| BLANC (*) | 68 | 39 | 37.24 | 21.66 | 15.58 |
| FILM1 | 115 | 69 | 13.18 | 12.85 | 0.32 |
| FILM2 | 105 | 66 | 15.58 | 13.69 | 1.89 |
| FILM3 | 107 | 64 | 15.56 | 14.34 | 1.22 |

(*) comparison
SCA = static contact angle

The invention claimed is:

1. A (per)fluoropolyether polymer (P) comprising at least one (per)fluoropolyoxyalkylene chain ($R_{pf}$) having two chain ends, wherein at least one of said chain ends bears at least one group of formula -B-(E)$_t$, wherein:
t is an integer equal to or higher than 2;
B is a group complying with the following formula (B-I):

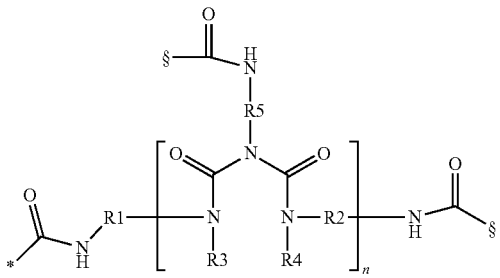

(B-I)

wherein
R1, R2 and R5, identical to or different from each other, are a linear or cyclic aliphatic group comprising 6 carbon atoms, optionally substituted with one or more linear or branched alkyl groups having from 1 to 3 carbon atoms, or a 6-membered aromatic group, optionally substituted with one or more linear or branched alkyl groups having from 1 to 3 carbon atoms,
R3 and R4 are each individually a hydrogen atom or together form a group of formula —C(=O)—,
n is an integer from 1 to 4,
symbol (*) indicates the bond to said chain ($R_{pf}$), and each symbol (§) indicates the bond to said moiety E; and
E is a moiety of formula (E-I):

$$—[OCH(CH_3)CH_2]_z—R_U$$ (E-I)

wherein
z is in an integer from 1 to 15,
($R_U$) is an unsaturated moiety.

2. The polymer (P) according to claim 1, wherein said chain ($R_{pf}$) is a chain of formula $$—(CFX)_{z1}O(R_f)(CFX')_{z2}\text{-D-O}—$$

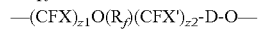

wherein
z1 and z2, equal or different from each other, are equal to or higher than 1;
X and X', equal or different from each other, are —F or —CF$_3$,
provided that when a and/or b are higher than 1, X and X' are —F;

D is a hydrogenated alkylene chain comprising from 1 to 6 carbon atoms, said alkyl chain being optionally substituted with at least one perfluoroalkyl group comprising from 1 to 3 carbon atoms;

($R_f$) comprises repeating units $R°$, said repeating units being independently selected from the group consisting of:

(i) —CFXO—, wherein X is F or $CF_3$;

(ii) —CFXCFXO—, wherein X, equal or different at each occurrence, is F or $CF_3$, with the proviso that at least one of X is —F;

(iii) —$CF_2CF_2CW_2O$—, wherein each of W, equal or different from each other, is F, Cl, or H;

(iv) —$CF_2CF_2CF_2CF_2O$—;

(v) —$(CF_2)_j$—CFZ—O— wherein j is an integer from 0 to 3 and Z is a group of general formula —O-$R_{(f-a)}$-T, wherein $R_{(f-a)}$ is a fluoropolyoxyalkene chain comprising a number of repeating units from 0 to 10, said recurring units being selected from: —CFXO—, —$CF_2CFXO$—, —$CF_2CF_2CF_2O$—, —$CF_2CF_2CF_2CF_2O$—, with each X being independently F or $CF_3$ and T being a $C_1$-$C_3$ perfluoroalkyl group.

3. The polymer (P) according to claim 1, wherein said moiety ($R_U$) is selected from the group consisting of:

($R_U$-I) —O—C(=O)—$CR_H$=$CH_2$
($R_U$-II) —O—C(=O)—NH—CO—$CR_H$=$CH_2$ wherein $R_H$ is H or a linear or branched $C_1$-$C_6$ alkyl group.

4. The polymer (P) according to claim 1, wherein said group (B) complies with one of the following formulae (B-I-i) to (B-I-v):

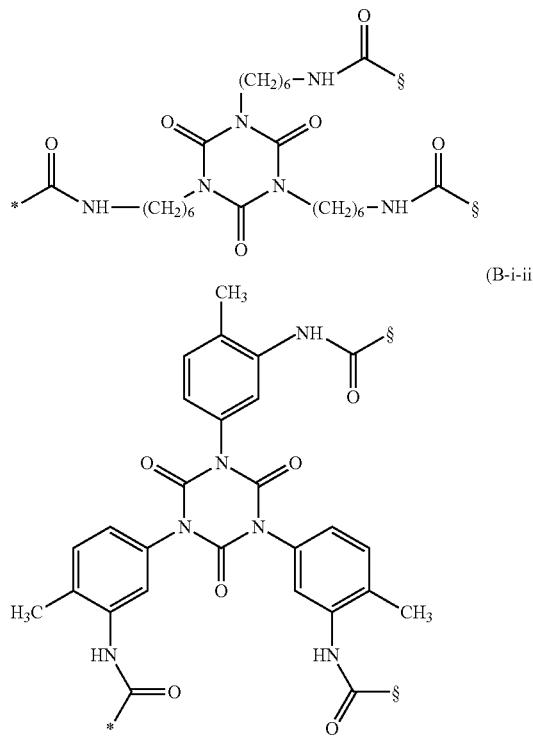

(B-I-i)

(B-i-ii)

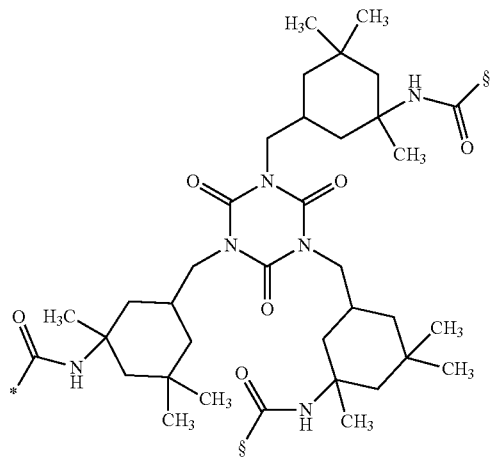

(B-I-iii)

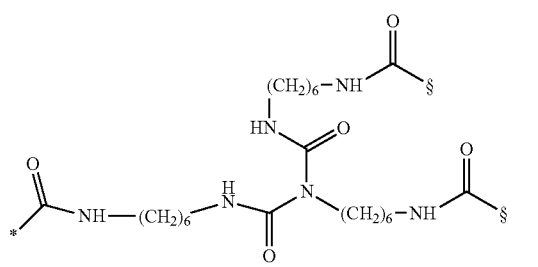

(B-I-iv)

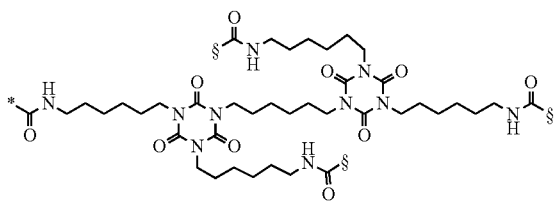

(B-I-v)

wherein symbol (*) indicates the bond to said chain ($R_{pf}$) and each of symbols (§) indicates the bond to a group of formula (E-I).

5. The polymer (P) according to claim 1, wherein said polymer (P) complies with the following formula (P-I):

   (P-I)

wherein ($R_{pf}$), (B), (E-I) and t are as defined in claim 1 and

T is a neutral group selected from: —H, —F, —Cl and linear or branched perfluoroalkyl groups comprising from 1 to 3 carbon atoms; or a group of formula (T-I):

   (T-I)

wherein

B and (E-I) have the same meanings defined in claim 1,

D* is a hydrogenated alkylene chain comprising from 1 to 6 carbon atoms, said alkyl chain being optionally substituted with at least one perfluoroalkyl group comprising from 1 to 3 carbon atoms, and t* has the same meaning defined for t in claim 1.

6. A process for the synthesis of polymer (P) as defined in claim 1, said process comprising:

(I) contacting at least one polyisocyanate compound (NCO) with at least one compound (U) of formula $$H\text{—}[OCH(CH_3)CH_2]_z\text{—}R_U \quad (U)$$

wherein $R_U$ is an unsaturated moiety and z is an integer from 1 to 15, wherein the ratio between the equivalents of said compound (NCO) and of said compound (U) is higher than 1;

(II) contacting the compound obtained in step (I) with at least one polymer (PFPE-OH), wherein polymer (PFPE-OH) is at least one (per)fluoropolyether polymer comprising a (per)fluoropolyoxyalkylene chain having two chain ends, wherein at least one of said chain ends comprises a hydroxy group, thus obtaining said polymer (P).

7. The process according to claim 6, wherein said compound (NCO) is obtained from the reaction of at least three molecules of the same diisocyanate compound, which react together to form a linear or cyclic molecule comprising at least three isocyanate groups.

8. The process according to claim 7, wherein said compound (NCO) comprises at least four isocyanate groups.

9. The process according to claim 6, wherein said compound (NCO) comprises three isocyanate groups and is represented by at least one of the following formulae (I) to (IV):

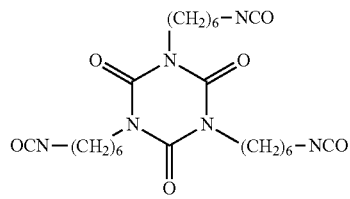
(I)

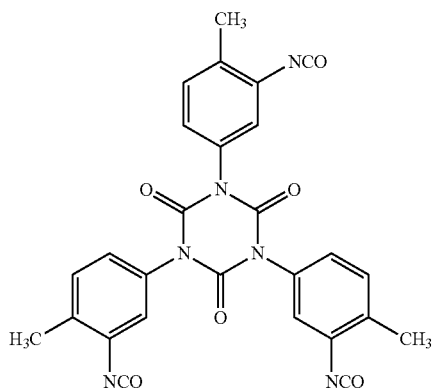
(II)

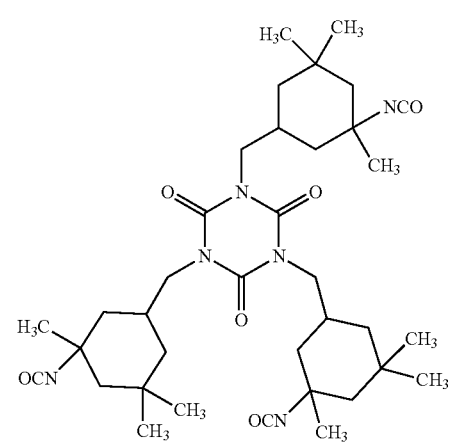
(III)

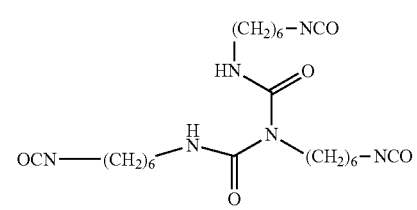
(IV)

or wherein said compound (NCO) comprises four isocyanate groups and is represented by the following formula (V):

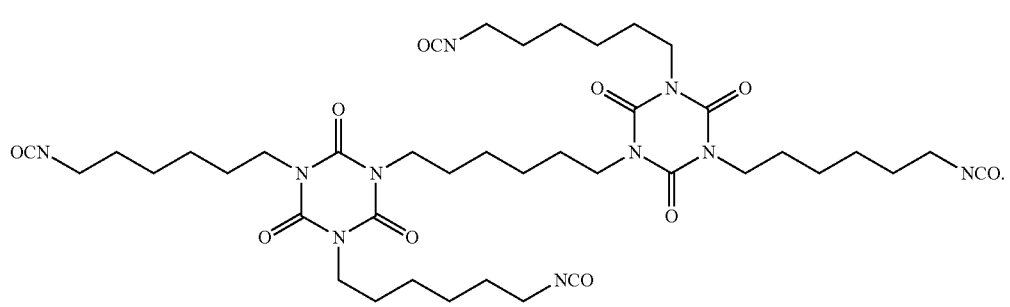
(V)

10. The process according to claim 6, wherein the equivalent ratio between said compound (NCO) and said compound (U) is from 1.1 to 2.

11. The process according to claim 6, wherein said step (II) is performed in the presence of a fluorinated solvent.

12. A composition (C) comprising at least one polymer (P) as defined in claim 1 and at least one solvent selected from: ketones; esters; organic solvents containing in the molecule an ester-ether group; and mixtures thereof.

13. The composition (C) according to claim 12, said composition (C) further comprising at least one UV-curable component, such that the amount of said polymer (P) in said composition (C) is from 0.01 to 8 wt. %, based on the total weight of said composition (C).

14. A method for providing a transparent coating onto at least one surface of a plastic substrate, said method comprising:
contacting at least one surface of at least one plastic substrate with polymer (P) as defined in claim 1; and
curing said polymer (P) onto said at least one surface.

15. The method according to claim 14, wherein the plastic substrate is selected from the group consisting of: polyethylene terephthalate (PET), polycarbonate (PC), polyvinyl chloride (PVC), thermoplastic olefin (TPO), thermoplastic polyurethane (TPU), polypropylene (PP), acrylonitrile butadiene styrene (ABS) and polyamides (PA).

16. The polymer (P) according to claim 1, wherein:
t is an integer from 2 to 3;
n is an integer from 1 to 2.

17. The polymer (P) according to claim 2, wherein z1 and z2, equal or different from each other, are from 1 to 3.

18. The polymer (P) according to claim 3, wherein $R_H$ is H or a linear or branched $C_1$-$C_3$ alkyl group.

19. The process according to claim 7, wherein said diisocyanate compound is selected from the group consisting of: hexamethylene diisocyanate; isophorone diisocyanate; xylylene diisocyanate; hydrogenated xylylene diisocyanate; isomers of methylene-bis(cyclohexyl isocyanate) and mixtures thereof; isomers of toluene diisocyanate and mixtures thereof; isomers of methylene diphenyl diisocyanate and mixtures thereof; toluidine diisocyanate; and naphthalene diisocyanate.

20. The process according to claim 10, wherein the equivalent ratio between said compound (NCO) and said compound (U) is from 1.2 to 1.8.

* * * * *